United States Patent [19]

Helbling

[11] Patent Number: 5,158,793
[45] Date of Patent: Oct. 27, 1992

[54] COFFEE MACHINE WITH PRODUCT SELECTIVITY

[76] Inventor: Edward Helbling, 47 Annandale Rd., Commack, N.Y. 11725

[21] Appl. No.: 805,364

[22] Filed: Dec. 11, 1991

Related U.S. Application Data

[60] Division of Ser. No. 602,361, Oct. 23, 1990, Pat. No. 5,094,153, which is a continuation-in-part of Ser. No. 512,764, Apr. 23, 1990, Pat. No. 5,080,008, which is a continuation-in-part of Ser. No. 389,424, Aug. 3, 1989, Pat. No. 4,967,648, which is a continuation-in-part of Ser. No. 218,107, Jul. 12, 1988, Pat. No. 4,858,523.

[51] Int. Cl.$^5$ ............... A47J 31/42; A47J 31/00
[52] U.S. Cl. .................... 426/231; 99/283; 99/289 R; 99/291; 99/299
[58] Field of Search ............ 426/231, 433, 388; 99/275, 279, 280, 281, 282, 283, 285, 286, 288, 289 R, 290, 291, 295, 299, 300, 302 R, 306, 307, 316

[56] References Cited

U.S. PATENT DOCUMENTS

| | | | |
|---|---|---|---|
| 3,076,404 | 2/1963 | Manaresi | 99/298 |
| 3,872,781 | 3/1975 | Helbling | 99/291 |
| 4,207,809 | 6/1980 | Brill | 99/295 |
| 4,550,652 | 11/1985 | Silva | 99/295 |
| 4,579,048 | 4/1986 | Stover | 99/295 |
| 4,745,852 | 5/1988 | Sager | 99/280 |

Primary Examiner—Robert W. Jenkins
Attorney, Agent, or Firm—Herbert Dubno

[57] ABSTRACT

A plurality of carafes on a coffee machine primarily for restaurant and institution use can be filled selectively with decaffeinated or normal coffee via a distributor between a brewing chamber and the outlets to the carafes. The microprocessor controller operates the device selecting the coffee for delivery to the brewing chamber in response to signals received from the carafes if they are placed at respective stations on the machine so that a decaffeinated carafe at any station will receive only decaf and a normal carafe will receive only normal coffee regardless of the station at which it is placed.

5 Claims, 11 Drawing Sheets

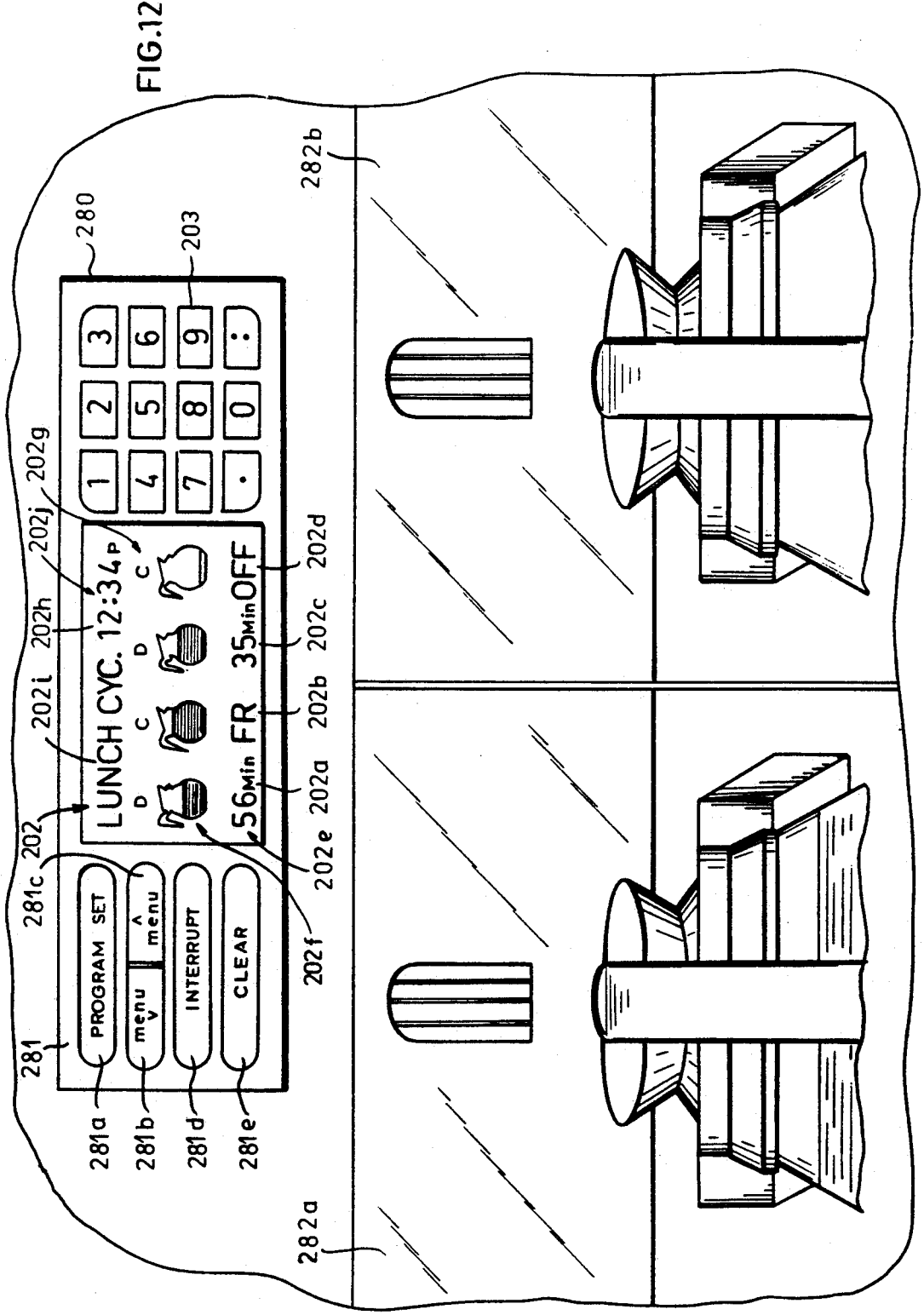

COFFEE MACHINE WITH PRODUCT SELECTIVITY

CROSS REFERENCE TO RELATED APPLICATIONS

This is a divisional of co-pending application, Ser. No. 07/602,361 filed on Oct. 23, 1990, now U.S. Pat. No. 5,094,153 which application Ser. No. 602,361, is a continuation-in-part of my application Ser. No. 07/512,764 filed Apr. 23, 1990, now U.S. Pat. No. 5,080,008, which was a continuation-in-part of Ser. No. 07/389,424 filed Aug. 3, 1989, now U.S. Pat. No. 4,967,648, as a continuation-in-part of application Ser. No. 07/218,107 filed July 12, 1988 (now U.S. Pat. No. 4,858,523 of Aug. 22, 1989).

FIELD OF THE INVENTION

My present invention relates to a coffee machine with improved product selectivity and, more particularly, to a coffee machine having improved capabilities when employed in restaurant and institutional facilities.

Specifically the invention relates to a coffee machine adapted to dispense a plurality of beverages, especially decaffeinated and regular coffee, hot water for tea and the like from a plurality of carafes. The invention also relates to a coffee machine of this type capable of automatically dispensing cup quantities of such beverages.

BACKGROUND OF THE INVENTION

The advent of machines capable of producing pots of coffee utilizing a filter containing a quantity of ground coffee beans to which hot water can be fed, has revolutionized the art of coffee preparation and machines for this purpose have become wide-spread in the home and in restaurants and other institutions. In a home coffee machine of this type, a measured quantity of water is introduced into a reservoir and passes through a heater into a brewing compartment which may contain a replaceable, disposable filter and a measured quantity of coffee grounds. The coffee grounds, in accordance with the requirements of the user, generally are manually added to the filter from a can of regular coffee non-decaffeinated coffee or from a can of decaffeinated coffee.

Below the brewing compartment, generally on a heating plate, a carafe can be positioned to receive the brewed coffee. In some cases, the brewing compartment is mounted on the mouth of the carafe.

While such systems have been found to be suitable for the home or wherever relatively small amounts of the beverage are to be dispensed, these machines have not found widespread accept-ability in restaurants and other institutional facilities which require machines capable of serving a larger number of patrons.

Accordingly, it is not uncommon for such a facility to have a coffee making machine in which a plurality of carafes are provided on respective hot plates or heaters and one or more carafes may be filled with hot water for tea, decaffeinated coffee and normal coffee, in readiness for service to the patrons, while a single coffee making station is provided on the machine below a brewing compartment of the type described having a replaceable filter which can be introduced into the machine and removed from the machine, for example, on a filter carrier. The latter can be filled with a measured amount of coffee grounds, once a filter has been inserted therein, e.g. in a separate station.

Such coffee makers have the drawback that they rely heavily upon manual intervention which is involved in all phases other than the brewing process, but can be connected directed to a water supply line so that they need not be filled manually with measured quantities of water. Manual intervention is required to introduce the coffee grounds which are to be employed. In addition, the versatility of such machines leaves much to be desired.

In a significant improvement of this type of apparatus, I have described in my U.S. Pat. No. 4,858,523, of which application Ser. No. 07/389,424 is a continuation-in-part, an automatic infusion beverage apparatus which greatly facilitates the automation of the coffee making process and can use prepackaged quantities of coffee grounds and respective filter units to which a distributor can selectively feed the hot water to produce the beverage.

The beverage is dispensed from a tank, for example.

In the improvement described in my copending application Ser. No. 07/389,424, these principles are extended to a system in which carafes can be individually filled with selected beverages brewed from a plurality of compartments.

Attention should also be directed to the rather complex coffee making machine described in U.S. Pat. No. 4,858,523 which has a source of coffee grounds, namely, a grinder associated herewith and thus does not require preparation of the grounds separately or manual measurement of the grounds which are to be used in making a quantity of the coffee.

In a still earlier U.S. Pat. No. 3,872,781, I have described an automatic coffee brewer which utilizes a plurality of brewing compartments.

Finally, reference should be made to U.S. Pat. No. 4,732,079, 4,583,449, 4,389,924, 4,200,039, 4,758,709, 4,725,714, 4,655,123 and 4,262,585 which detail a variety of systems for brewing the coffee, heating the water for such brewing and controlling the process.

By and large, while the art cited above discloses that it is known to provide a source of coffee grounds within the apparatus, e.g. a supply of coffee beans and a grinder, these earlier machines are relatively complex and do not fully satisfy the need for large volume coffee preparation and the specific needs of restaurants, short order facilities and other institutions supplying coffee to large members of consumers.

OBJECTS OF THE INVENTION

The principal object of my present invention is to extend the principles of my above mentioned copending applications Ser. No. 07/512,764 filed Apr. 23, 1990 and Ser. No. 07/389,424 and my prior application Ser. No. 07/218,107 filed Jul. 12, 1988.

A more general object is to provide an improved coffee making machine which avoids drawbacks of prior art coffee makers and has high versatility and adaptability, especially for use in restaurants, short-order facilities and institutional applications.

Another object of this invention is to provide a highly automatic coffee making machine which can eliminate problems with confusion between various types of brewed beverages, especially decaffeinated coffee and regular or nondecaffeinated coffee.

It is also an object of the invention to provide an apparatus of the type described which has improved facilities for the service of patrons in small quantities, i.e. will permit the dispensing of cup quantities of coffee as need arises.

SUMMARY OF THE INVENTION

These objects and others which will become apparent hereinafter are attained, in accordance with the present invention, in an apparatus for brewing coffee which comprises a brewing compartment, means for selectively feeding that brewing compartment with a plurality of infusion substances from which respective beverages can be brewed, e.g. normal coffee grounds or decaffeinated coffee grounds, means for feeding hot water to the brewing compartment to the brewing compartment, and distributing means between the brewing compartment and a plurality of carafe stations for selectively delivering the particular brewed beverage to a respective outlet for a carafe assigned to that particular beverage.

It will be understood that it is common in restaurants and like facilities to make available distinct carafes for normal coffee and decaffeinated coffee.

With the system of the present invention, a microprocessor controller is provided to insure that, when decaffeinated coffee is brewed, for example, the distributor will feed the brewed decaffeinated coffee only to the carafe which has been specifically assigned to receive it and is color coded or otherwise demarcated so that the waiter, waitress or other individual dispensing the product can be assured that the proper type of coffee has been fed to the proper carafe.

According to a feature of the invention, the microprocessor controller, which in general is capable of performing the functions described in my above identified copending application and my earlier U.S. Pat. No. 4,858,523, responds to sensing means at the respective stations of the machine to signal the microprocessor controller as to the type of carafe which is present at a particular station. These sensors also serve to indicate to the microprocessor controller when a station is empty, i.e. does not have a carafe located thereat, thereby avoiding the dispensing of the beverage at a location from which a carafe has been removed.

I have found it to be advantageous to provide a motorized distributor which selectively receives the coffee grounds from one or another hopper or bin containing ground decaffeinated and ground normal coffee respectively, and delivering a measured quantity of the grounds to the brewing chamber.

Of course, if desired, a common coffee grinder can be provided between the motorized scooper of coffee metering device so that coffee beans of one or the other type can be drawn from the respective bin, delivered to the grinder and fed in the form of grounds to the brewing compartment.

According to a further feature of the invention, the machine not only has a plurality of stations for the respective carafes, but also a tank into which a larger quantity of coffee can be introduced so that the service employee need only draw upon this quantity for cup filling or for the filling of carafes if a higher rate of dispensing is desired.

According to another feature of the invention, the machine can be equipped with a device for filling individual cups of coffee, e.g. for takeout service. This device can be provided with a plunger which lowers a sealing head into the mouth of the cup and through which the cup can be fed with the brewed beverage selected with the microprocessor in the manner described or dispensed from a tank of the type also described previously. Advantageously, sensor means provides an input to the microprocessor which can respond to the cup which is positioned at the cup-filling station and communicating with the microprocessor to dispense the volume required to fill that cup. The apparatus can be used, for example, to selectively fill 4, 6 or 8 ounce cups as the need dictates.

According to a feature of the invention, the machine can have at least two permanent dispensing stations for, for example, decaffeinated and regular coffee (and, if desired, tea or hot water), the stations being color coded to correspond to a color coding of the receptacle. Means can be provided when the proper carafe or other receptacle is positioned at the correct station, based upon the color coding, for automatically dispensing the respective coffee beverage into the receptacle. This eliminates the need to have the user operate a button or activate a menu for initiation of brewing and selection.

A coffee making machine of this design can be a comparatively low cost machine. According to another aspect of the invention, sensor means is provided at each of a plurality of stations for automatically initiating the brewing and dispensing of respective coffee beverage upon the positioning of one of the receptacles at a respective station. The sensor means can include a sensor element responding to a quantity of a beverage remaining in a receptacle disposed at the respective station and preferably an ultrasonic sensor.

In this embodiment as well, cooperating identification means can be provided on the receptacles and at the stations to provide inputs to control means automatically responsive to such identification means for directing each of the beverages to the respective receptacle assigned thereto. The control means can include the aforedescribed microprocessor-based central processing unit while the cooperating identification means can include a magnetic strip on each of the receptacles and a magnetic strip reader at each of the stations positioned to read the magnetic strips on the receptacles.

While in most cases, the receptacles will be carafes and the identification means will include magnetic strips along neck bands thereof, it is also possible in accordance with the invention to provide the plurality of receptacles as bulk coffee carriers having dispensing spigets for dispensing the respective beverages. In the latter case, the machine is simply used to fill the bulk coffee carriers when need arises. The bulk coffee carriers are transported to heating units which maintain the temperature of the beverage for dispensing.

Advantageously, the brewing means on the housing can comprise at least one and preferably at least two brewing units each having a brewing compartment provided with a filter and a scooper arrangement for metering a predetermined quantity of ground coffee into the brewing compartment. The filter may be carried by a rotor or turntable which can swing the filter into a cleaning position in which it is flushed with water under the control of CPU and the coffee grounds can be collected, upon flushing from the filter, on a foraminous tray below the flushing location and constructed so as to be removable from the machine for washing and disposal of the coffee grounds.

The rotor can carry two or more of such filters so that a previously flushed filter can be positioned to brew coffee while another filter is being flushed. The compartments for the filters may likewise be rotatable on the turntable.

The invention also comprises a method of operating the machine by the steps of:

(a) automatically sensing a level of a coffee beverage in a receptacle disposed at one of the stations;

(b) identifying the receptacle with a particular one of the beverages; and (c) upon the level sensed in step (a) falling below a predetermined level, automatically brewing the particular one of the beverages and dispensing the brewed beverage into the receptacle.

The method can also comprise the step of establishing a duration for which a quantity of one of the beverages has been present in a respective receptacle and thus might be stale. In that case, the CPU may cut off the heater for that receptacle or interrupt the brewing cycle so that fresh beverage will not be introduced into the stale product.

BRIEF DESCRIPTION OF THE DRAWING

The above and other objects, features and advantages of my invention will become more readily apparent from the following description, reference being made to the accompanying highly diagrammatic drawing in which:

FIG. 12 is a detail of the front panel;

SPECIFIC DESCRIPTION

Figure 1:
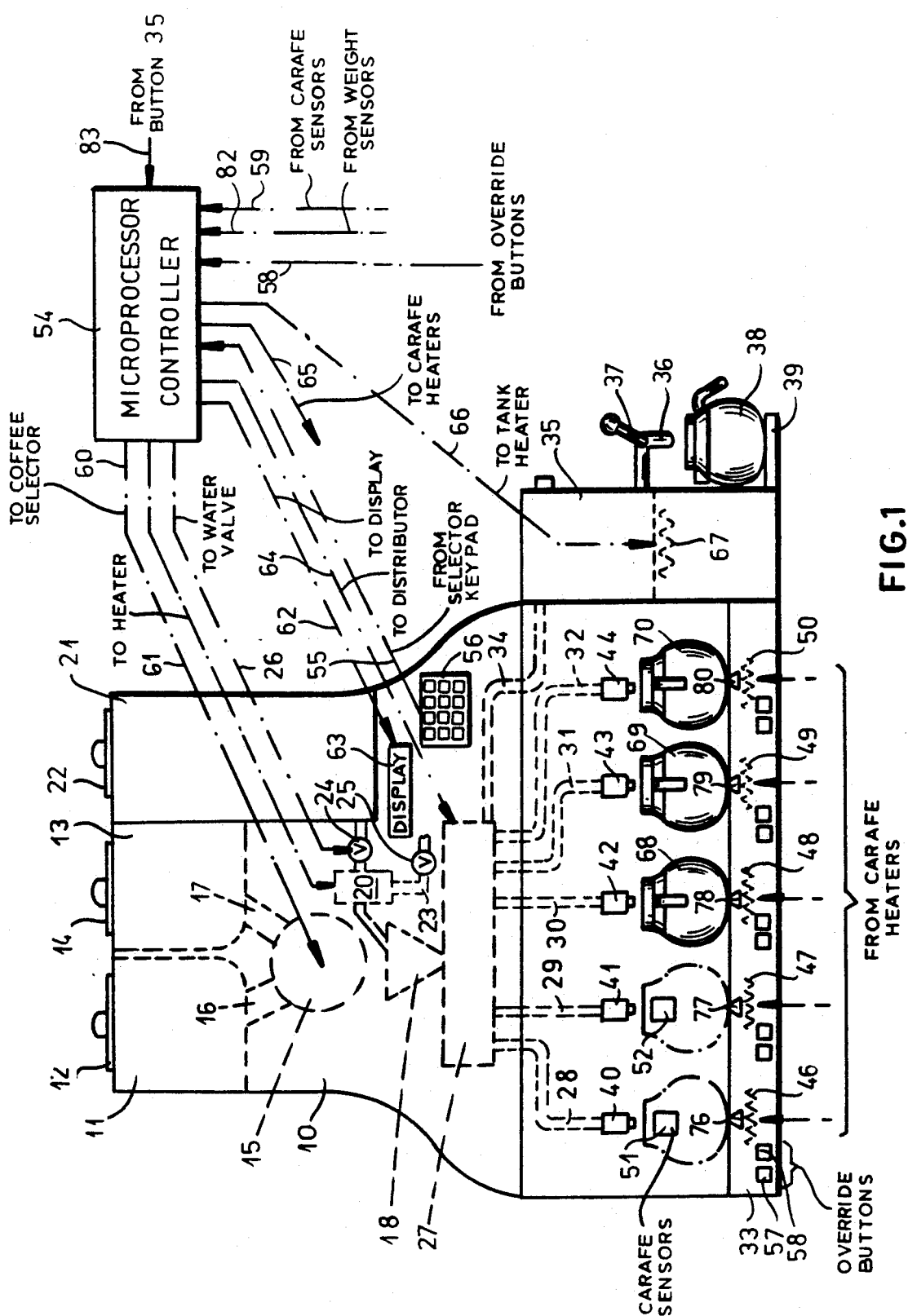
FIG. 1 is an elevational view of a coffee making machine illustrated in highly diagrammatic form, with the control system which is built into the machine being illustrated in block diagram from outside the machine housing.

In FIG. 1 of the drawing, I have shown a coffee making machine which comprises a housing 10 and, within that housing, and, within that housing, a bin 11 which can be filled with ground decaffeinated coffee beans upon removal of a cover 12, and a bin 13 which can be filled with ground normal (nondecaffeinated) coffee through a cover 14. In place of the ground coffee in these bins, the bins may be used to dispense coffee beans and in that case a coffee grinder can be interposed between the metering device and the brewing chamber or compartment as has been mentioned previously.

A metering device which can be a motorized drum 15 is provided between the spouts 16 and 17 of the bins, and the brewing compartment 18 which is a conical housing holding a permanent coffee filter. If desired, the coffee filter may be replaceable through an opening provided in an end wall of the housing 10. The motorized distributor 15 may also be a scooper which can selectively dip into quantities of the respective grounds or beans as desired. Upon rotation of the device 15, an opening of the latter can be selectively communicated with one of the spouts 16 and 17 and then, after a metered quantity of coffee has been transferred to the device 15, can be rotated to dump this coffee into the brewing compartment 18.

Also communicating with the brewing compartment 18 and in an illustrated diagrammatically, for a water feed pipe 19 which extends from an electric heater 20 of the instantaneous heating type.

The water fed to the heater 20 can drive form a reservoir 21 which can be filled upon removal of a lid 22, or from a water supply pipe 23 connected to the water mains or waterline of the restaurant or other institution.

A valve 24 or 25 provided with a valve control line 26 is provided to regulate the flow of water to the brewing compartment 18 in accordance with the quantity of coffee which has been placed in this compartment and the amount of coffee which is to be brewed.

The brewed coffee, in turn, is fed to a distributor 27 which may be of the type described in my aforementioned copending application Ser. No. 07/389,424 which is incorporated herein in its entirety by reference.

From that distributor, a plurality of outlet lines 28, 29, 30, 31 and 32 can extend to a multiplicity of carafe stations in a platform 33 of the housing 10.

A further coffee outlet line 34 delivers coffee to a tank 35 having an outlet spigot 36 controlled by a lever 37 for manually dispensing coffee, e.g. into a carafe 38 on a support 39 adjacent the tank.

Figure 2:
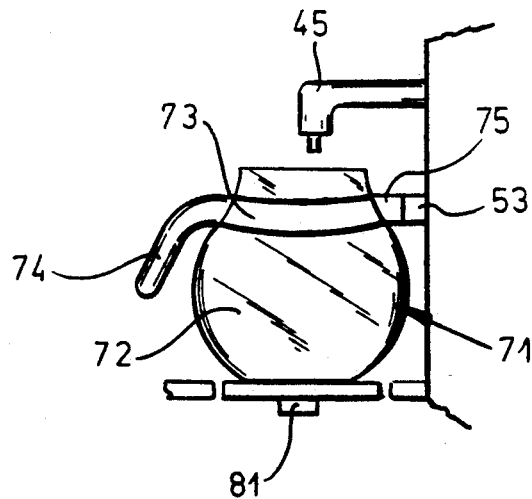
FIG. 2 is an elevational view showing the interaction between a carafe and a carafe sensor according to the invention.

Each of the carafe stations has an outlet spigot 40, 41, 42, 43 and 44, one of which has been illustrated in side view at 45 in FIG. 2. In addition, each station has a heater 46, 47, 48, 49, 50 and a carafe sensor of which only two have been illustrated at 51 and 52 in FIG. 1 and at 53 in FIG. 2. The function of the carafe sensor will be developed below.

In addition, the apparatus comprises a microprocessor controller 54 which may also be of the type described in my abovementioned copending application Ser. No. 07/389,424 and can perform all of the functions described therein as well as those detailed below. As in that application the microprocessor has a number of inputs. For example, to program the unit and for product and quantity selection purposes, an input 55 can be provided from a selector key pad 56. Any other push button array or selector button array may be used if desired. Inputs also derive from override buttons 57 and 58 at each carafe station to enable the operator to override the computer control and manually select normal coffee or decaffeinated coffee for the particular station. The inputs from the override buttons have been represented diagrammatically at 58. The carafe sensors 51 to 53, etc. supply inputs to the microprocessor controller as represented at 59.

As is also clear from the abovementioned copending application, the microprocessor controller will have a multiplicity of outputs. These outputs can include a controller line 60 for the coffee scooper or metering device 15, a control output 61 to the heater 20, the line 26 running to the water valves 24 or 25, an output 62 to a display 63 which can be of the liquid crystal type and can display both the status of the apparatus and selections as they are made and entered, in output 64 to the distributor 27, an output 65 to the carafe heaters 46 to 50 and an output 66 to a heater 67 for the tank 35. Carafes 68, 69 and 70 are shown to be in place on respective stations and that stations of the sensors 51 and 52 are shown to have no carafes positioned thereon, the carafes having been removed, for example, by service personnel to fill the coffee cups of consumers.

As can be seen from FIG. 2 each carafe, such as the carafe 71 illustrated in this figure, can comprise a transparent glass vessel 72 formed with a band 73 on which a handle 74 is mounted. The color of the band 73 can indicate the type of coffee which it is intended to dispense therefrom. For example, this band may be orange for dispensing decaffeinated coffee or brown or black for dispensing normal coffee. The band carries a coded element 75, for example, a magnetized plate with a magnetized pattern which can be read by the sensor 53. It will be understood, however, that any other type of coding can be used as well. For example, member 75 may be provided with a plurality of electrical contacts which can cooperate with contacts in member 53 to signal to the microprocessor the particular type of carafe which is positioned at the station associated with that sensor. Alternatively, an optical sensor may be used and can respond to the color of member 75. In still another alternative, member 75 may be provided with a bar code to which a bar code reader head may respond, each of the sensors 53 then forming a bar code reader head. The sensor can respond to one item of information, namely, the type of coffee required for the particular carafe, or to substantially more information, for example, both the type of coffee and the quantity which can be held by the particular carafe if carafes of different volumes are used in the system.

As each empty carafe is placed upon its station, the fact that it is empty can be detected be respective weight sensors shown only diagrammatically at 76, 77, 78, 79, 80 and 81 in FIGS. 1 and 2, and a signal provided to the controller 54 via the line 82 to signal the controller to begin a carafe filling sequence. Since the carafe sensor 51 to 53 has simultaneously determined which type of coffee is to be supplied to the carafe or, via the coding, whether the carafe is only to be filled with hot water for tea, for example, the controller 54 can either activate the device 15 to select the appropriate quantity of the coffee or simply signal the water heater 20 and valve 24 or 25 and the distributor 27 to deliver a metered quantity of hot water to the carafe.

If one of the types of coffee is selected, the coffee grounds are automatically delivered to the brewing chamber 18 which is supplied with the heated water via one of the valves 24 or 25 and the coffee is then delivered to that carafe.

A button on the tank 35 can be depressed to supply an input to the microprocessor controller 54 via the line 83 to similarly cause the microprocessor controller to repeat the coffee brewing process a number of times so that the brewing chamber is fed via one of the valves 24 or 25 and the coffee is then delivered by the distributor 27 to the tank 35 to refill the latter.

Of course, an override button 57 or 58 may be pushed for any of the carafe stations to override the instruction generated by the microprocessor and, for example, switch between caffeine containing coffee and decaffeinated coffee should the need arise.

While the apparatus as described operates with coded carafes to automatically input information as to the coffee desired for the carafe to the microprocessor, it will be understood that it is possible to provide separate stations for normal coffee and decaffeinated coffee, for example, and to so define those stations that only the appropriate carafe will fit each station.

Figure 3:
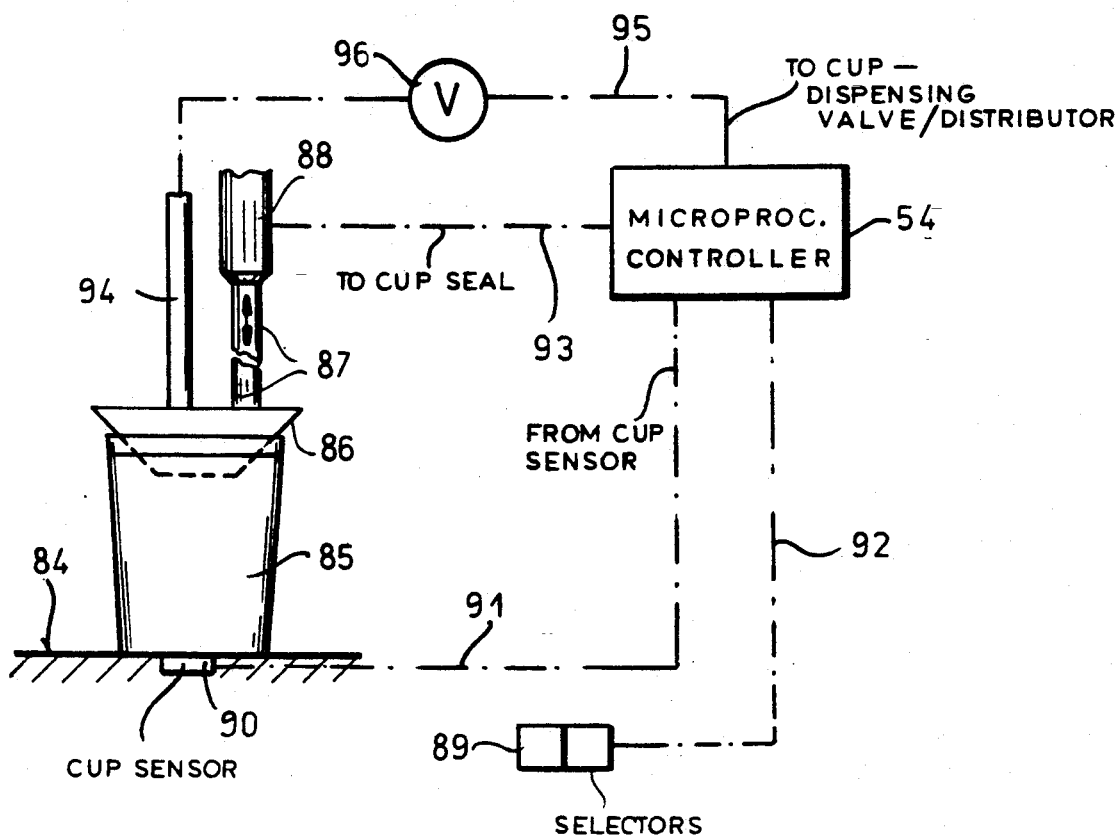
FIG. 3 is an elevational view illustrating a cup filling unit which can be provided on the machine of FIG. 1, e.g. on the side thereof opposite the tank or at the same side as the tank.

In FIG. 3 I have shown an additional station for the machine of FIG. 1 which is not visible in this figure because it may be behind the tank 35 shown therein or can be substituted for the tank 35. This station has a platform 84 on which a takeout-type coffee cup 85 can be placed. Above this station a sealing head 86 is displaceable vertically by a plunger 87 having a drive 88 which can be hydraulic, pneumatic or electrical so that the head 86 can be automatically lowered when a cup 85 is placed on the plate from 84 and automatically raised upon completion of a coffee dispensing operation.

The cup-sealing arrangement 86 to 88 is operated by the microprocessor 54.

The inputs to the microprocessor for this purpose can derive from a selector switch 89 disposed at the cup filling station and from a cup sensor 90, e.g. a weight sensor.

When a cup 85 is placed on the sensor 90, a signal is transmitted via the line 91 to the microprocessor, indicating the size of the cup. When one of the selector buttons 89 is actuated to select decaf coffee, normal coffee or hot water for tea, the appropriate signal via line 92 to the microprocessor results in the delivery of a signal via line 93 to the cup seal unit 86 to 88 to lower the sealing head 86 to close the mouth of the cup except for a small vent passage (not shown).

The filling of the cup with coffee or water is effected via line 94 by an input through line 95 to a dispensing valve 96 and the distributor so that an appropriate quantity of the selected beverage will be delivered to the cup.

When delivery is completed, the head 86 automatically raises and the lid can be placed upon the cup and the cup delivered to the patron.

The machine 100 shown in FIG. 4 can be operated in the same manner as the machine described in connection with FIGS. 1 through 3 and differs only in the layout of the various elements visible from the exterior of the machine. The machine 100 has a base 101 on which the stations 102, 103, 104, for example, can be provided. These stations can be used interchangeably to receive a cup 105, a carafe 106 and a portable tank 107 from which the coffee can be dispensed via a spigot 108. Appropriate sensors like those at the stations described in the embodiment of FIGS. 1 through 3 can detect corresponding signalling devices or can respond to the weight of the cup, a carafe or a portable tank so as to signal the microprocessor as to the type of container which is positioned at the respective station. The coffee or other infusion beverage is delivered to the respective container in a quantity determined by the volume of that container.

To that extent, therefore, the stations 102-104 are interchangeable and all can receive carafes as described for the multicarafe arrangement of FIG. 1.

Figure 4:
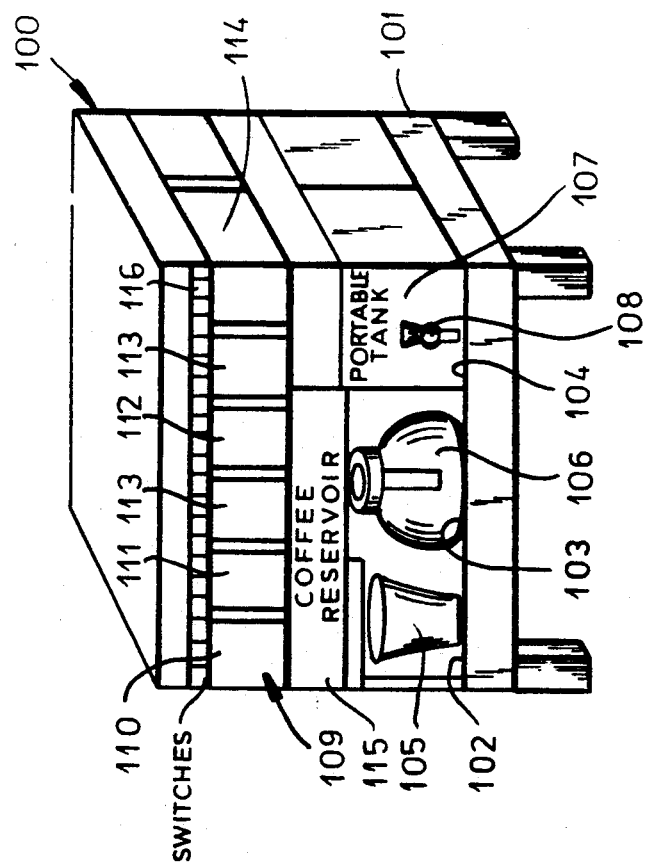
FIG. 4 is a diagrammatic perspective view of another machine configuration which can be employed according to the invention.

Another difference between the embodiment of FIG. 4 and the embodiment of FIG. 1 is the organization of the bins which are shown to lie in a row 109. These bins can include a bin for tea 110, bins for coffee 111 and 112, bin for decaffeinated coffee at 113 and 114 and at least one other bin as represented at 114 for receiving some other product which can be combined with hot water to form an infusion beverage.

The operation of the distributor for distributing the respective beverages to the selected stations and the means for selecting among the bins for preparation of the beverages has been described in connection with FIG. 1 and can be identical thereto here.

The permanent coffee tank or reservoir can here be provided as a horizontally extending reservoir 115 and can have its dispenser at a side of the machine not shown. The switches for controlling the microprocessor and selecting the product or a particular program can be provided in a row at 116 in the embodiment of FIG. 4.

Figure 5:
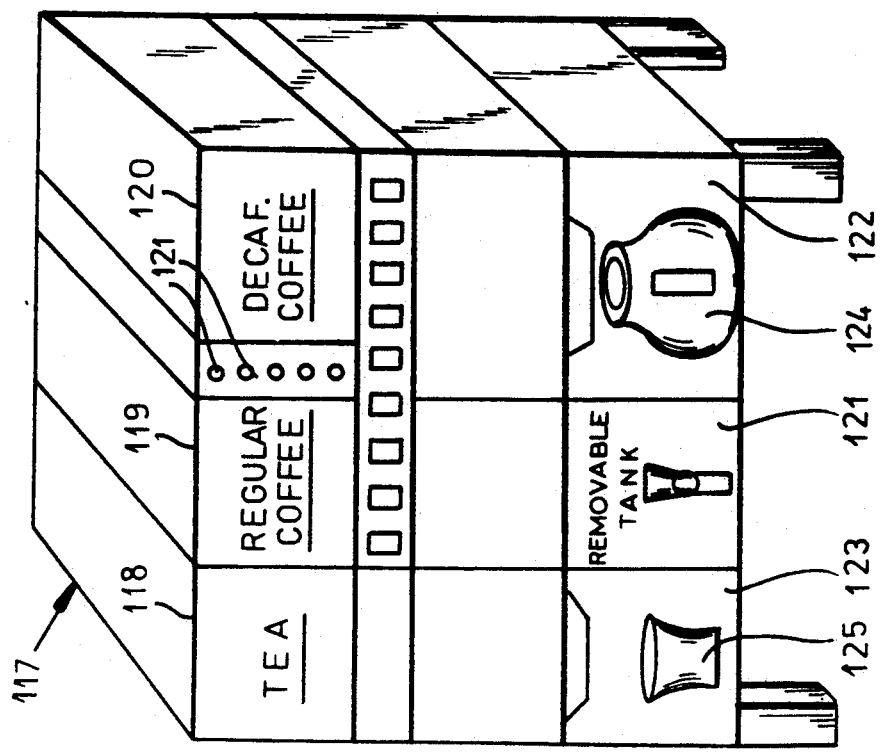
FIG. 5 is a view similar to FIG. 4 showing yet another machine configuration.

The embodiment of FIG. 5 utilizes principles similar to that of FIG. 4. The coffee machine 117 of this embodiment comprises respective bins 228, 119 and 120 for tea, regular coffee and decaffeinated coffee, respectively and pilot lights 121 can be provided to signal the status of the machine and the product which is being brewed. The removable tank 121 is here shown to be located between stations 122 and 123 which can dispense the beverage into a carafe 124 or a cup 125, respectively.

Figure 6:
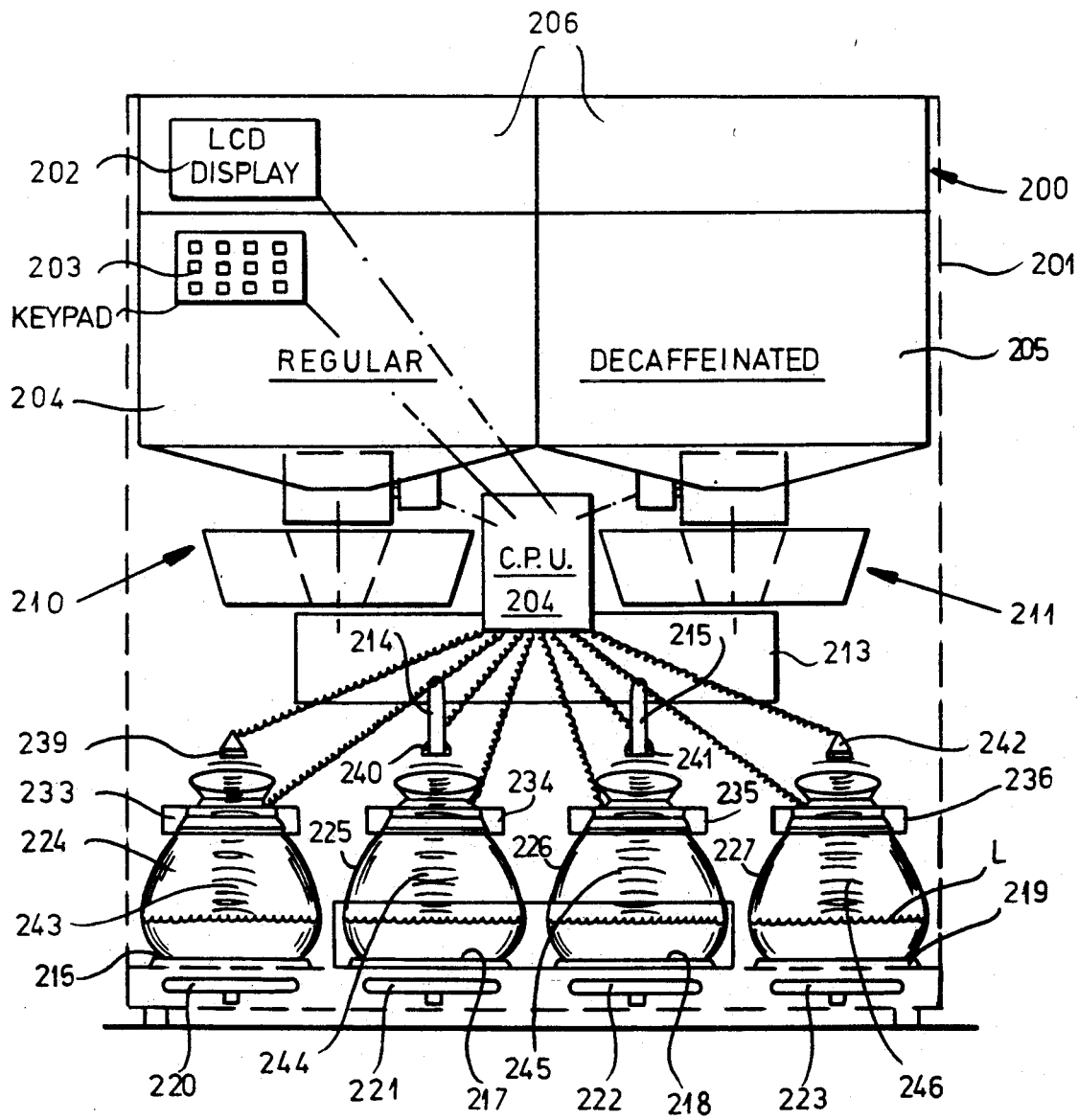
FIG. 6 is a front elevational view in highly diagrammatic form of another machine in accordance with the invention.
Figure 7:
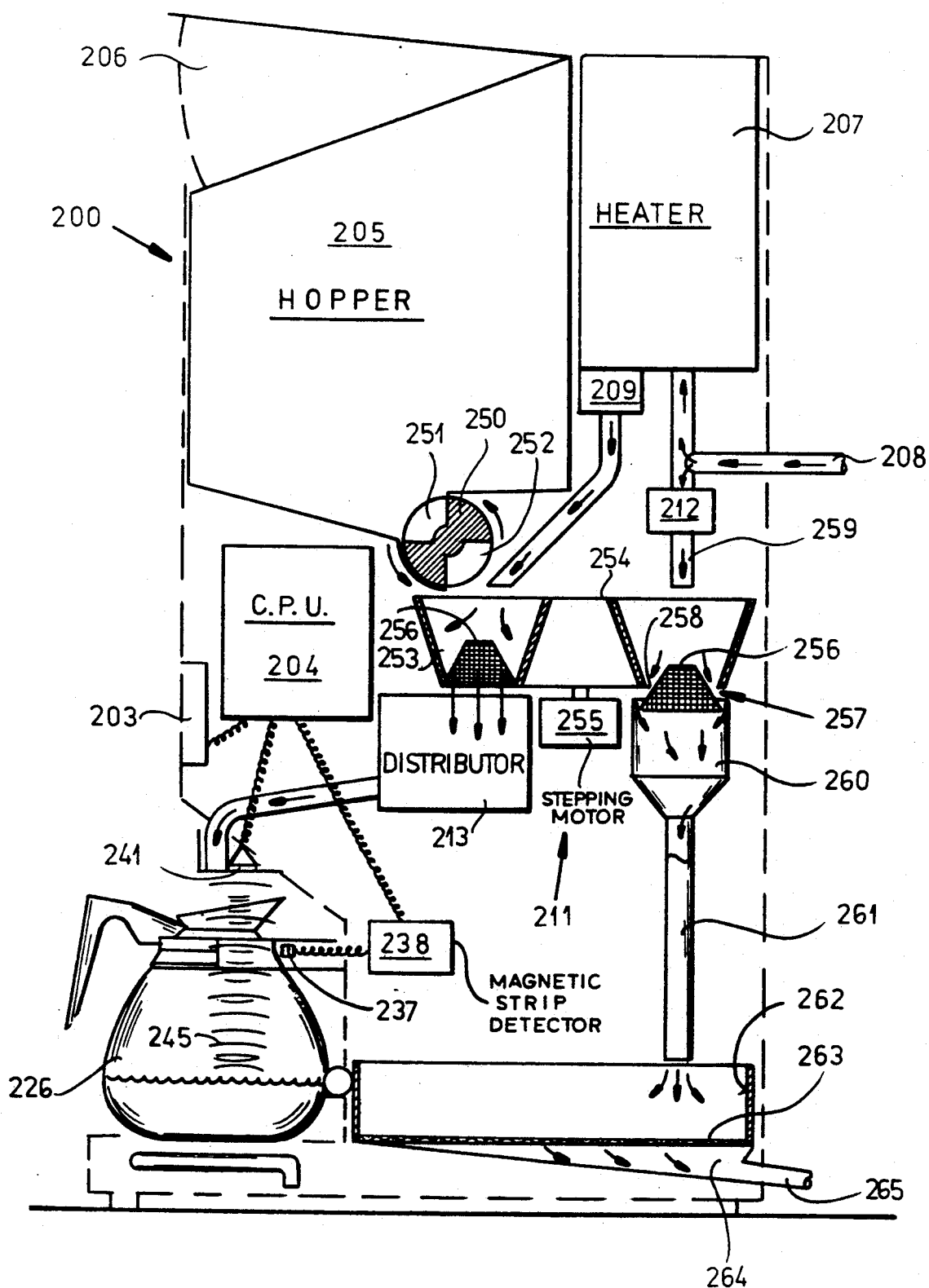
FIG. 7 is a diagrammatic side elevational view of this machine with one of the brewing and flushing units broken away.

Turning now to FIGS. 6 and 7, it will be apparent that a coffee making machine 200 of the invention can have a housing 201 on which an LCD display 202 and keypad 203 connected to a microprocessor based center processing unit 204 can be mounted. This housing is shown in broken lines in FIGS. 6 and 7 since it has been removed to illustrate interior structure.

The apparatus can comprise hoppers 204 and 205 for ground regular coffee and ground decaffeinated coffee and which are accessible through covers 206 one of which has been shown to be raised in FIG. 7 for replenishment of the ground coffee.

Behind the hoppers is located a flow through water heater 207 which is connected to a water supply 208 and which feeds, via solenoid valves 209 the respective brewing units 210, 211 (FIG. 6). Another solenoid valve 212 can be connected to the water supply for flushing the grounds for each brewing unit as will be discussed in greater detail below.

Below the brewing units 210 and 211 is a distributor 213 controlled by the central processing unit 204 and, in this embodiment, as illustrated, the distributor can be seen to have two spouts 214 and 215 which can dispense either decaffeinated or regular coffee as selected by the distributor 213 and the central processing unit 204.

The machine comprises four stations 216, 217, 218 and 219 provided with respective heating elements 220, 221, 222, 223 operated by the central processing unit.

Only stations 217 and 218 serve to dispense coffee, the remaining stations being warming stations holding reserve supplies of previously brewed coffee for dispensing from respective carafes.

Figure 9:
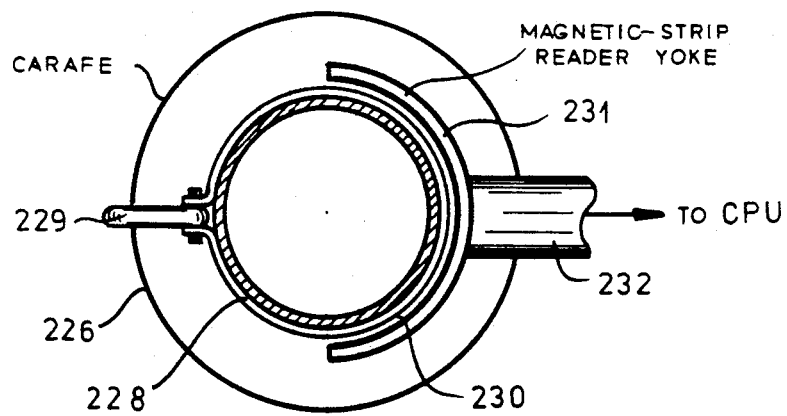
FIG. 9 is cross sectional view of a carafe as seen from the top and showing the magnetic strip reader yoke of the invention.

The carafes are represented at 224, 225, 226 and 227. In the embodiment illustrated, moreover, each of the carafes, for example, the carafe 226 shown in FIG. 9, can have a neck band 228 to which the handle 229 is attached. Along a substantial length of this neck band, magnetic identification can be provided in a strip 230 which can be read by a magnetic strip reader in the form of a yoke 231 mounted by a bracket 232 on the machine.

The yokes 231 constituting the sensors have been represented diagrammatically at 233, 234, 235 and 236 in FIG. 6 and generically as a sensor 237 in FIG. 7 providing an input to the magnetic detector circuitry 238 which is connected to the central processing unit.

Each of the stations may also have a sensor 239, 240, 241 and 242 positioned directly above the mouth of the carafe and constituting an ultrasonic detector of the type used for distance ranging in instant camera and in distance measuring devices to detect the level L of liquid in the sensor by ultrasonic or sonar techniques represented by the sound waves L shown diagrammatically at 243, 244, 245 and 246 in FIGS. 6 and 7.

The brewing unit shown diagrammatically at 211 in FIG. 7 can comprise a rotary scooper 250 having pockets 251 and 252 receiving the ground coffee from the hopper 205, for example, and dispensing it in a metered quantity into the brewing compartment 253 of a rotor 254 driven by a stepping motor 255. On the rotor, a plurality of filters 256 can be mounted in the respective brewing compartment and can be guided on a cam surface so that, while the respective brewing compartment is located above the distributor, the filter closes the bottom of the compartment.

However, when the compartment is rotated into a flushing position 257, the cam surface, which is not visible in the drawing, permits the filter to lower slightly and thereby form a narrow gap 258 through which the grounds can be flushed by the flushing water discharged from the spout 259 of the solenoid valves 212.

The flushing water, together with the grounds, is collected in a funnel 260 and led by a pipe 261 into a collecting tray 262 at the bottom of the machine. The collecting tray 262 has a foraminous bottom 263 upon which the grounds can collect.

The water is led away via the collector 264 to a drain 265.

The tray 262 is removable from the housing so that the collected grounds can be dumped.

Basically, of course, the machine of FIGS. 6 and 7 operates in the manner described. Utilizing the control panel 203 the memory of the central processing unit can receive a particular program for brewing coffee in accordance with the needs at various times of the day and the assignments of the various carafes or pots with the respective stations. The sensors 239-242 detect the level of beverage in the respective carafes while the sensors 233-236 identify to the CPU the particular carafe associated with that sensor so that the CPU is continuously informed as to the availability of coffee of the particular type in the respective carafes. When the level of coffee in one of the stations 217, 218 is below a particular level and, for example, the carafe at the associated station 216 is likewise low as determined by the programming, brewing will ultimately be initiated of the particular coffee beverage. The handles of the carafe can be color coded in association with the particular type of beverage to be dispensed, for example, orange for the carafes which are to dispense decaffeinated coffee and dark brown for the carafes to dispense regular coffee.

A brewing cycle is initiated by the operation of the scooper 250 to deposit a predetermined quantity of the respective ground coffee in the brewing compartment 253 above the distributor 203 and the solenoid valve 209 is energized to feed a predetermined quantity of hot water through the grounds into the carafe selected by the distributor 213. Simultaneously or thereafter, flushing of a previously used compartment may be effected in the manner previously described.

Figure 8:
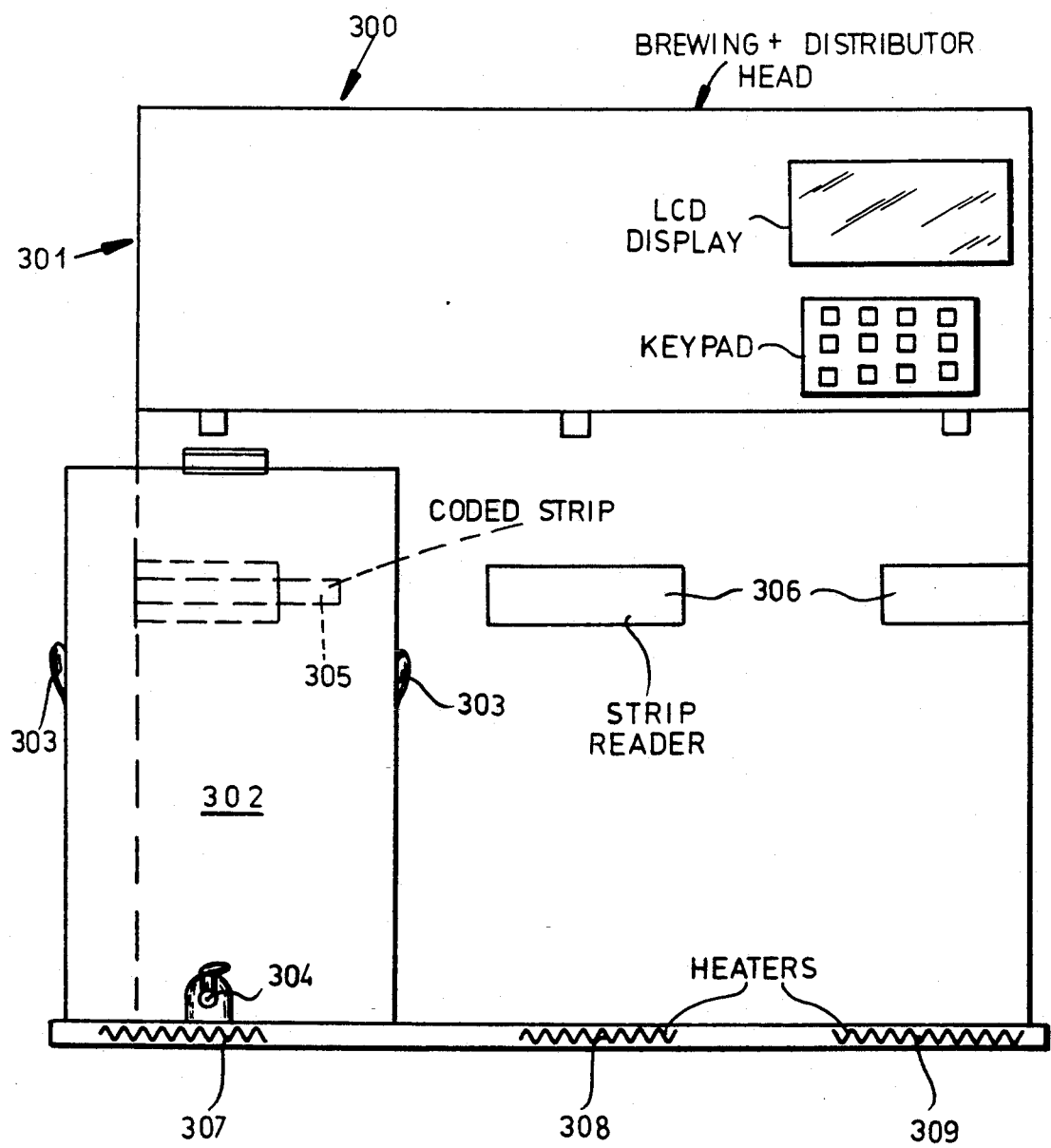
FIG. 8 is a diagrammatic elevational view of a machine for brewing the coffee into bulk coffee carriers.

Similar principles are applicable to the machine shown at 300 in FIG. 8 and which comprises a brewing and distributor head 301 like the brewing and distributor means of the embodiment of FIGS. 6 and 7 except that a significantly large quantity of coffee can be dispensed.

In this case, the receptacles are bulk coffee carriers 302 having handles 303, for example, and a dispensing spout 304 at the bottom thereof. Readable identification strips 305 can be provided on these containers as well for reading by the strip readers 306 of the machine. Level measuring devices can also be provided in this embodiment and the heaters at the respective stations are shown at 307, 308 and 309 respectively.

Figure 10:
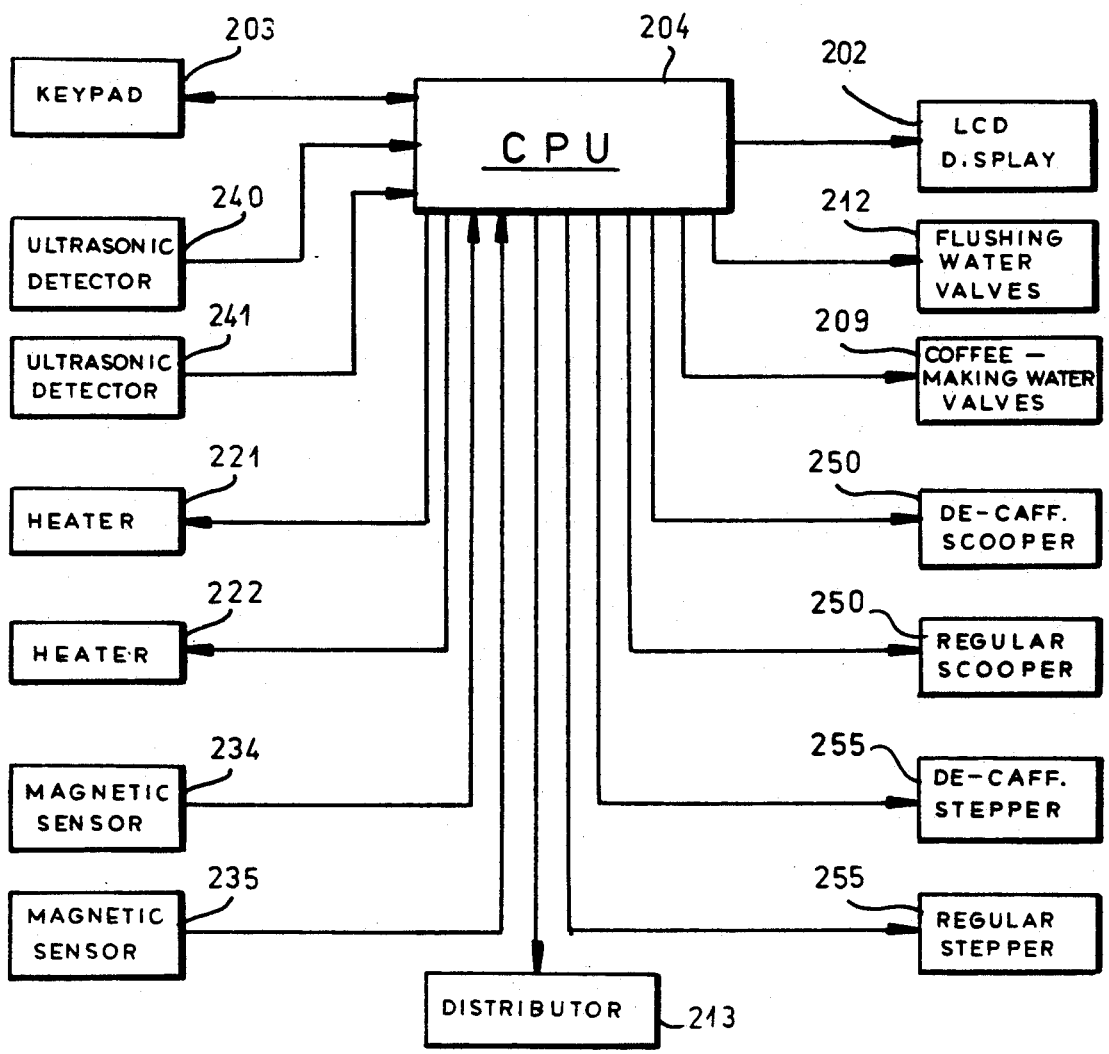
FIG. 10 is a block diagram of the control system.

In FIG. 10, I have shown in block diagram form the control arrangement for the system of FIGS. 6 and 7.

The key pad 203 is connected to the CPU 204 as has been described and the LCD display 202 is likewise connected to the latter. Inputs to the CPU also include the ultrasonic detectors 240, 241, for example and the magnetic strip sensors 234, 235. The heaters 221 and 222, for example, are controlled by the CPU which also operates the distributor 213.

The flushing water valves 212 and the coffee making water valves 209 are controlled by the CPU 204 as are the two scoopers 250 and the stepping motors 255 or the regular coffee and decaffeinated coffee brewing units.

Figure 11:
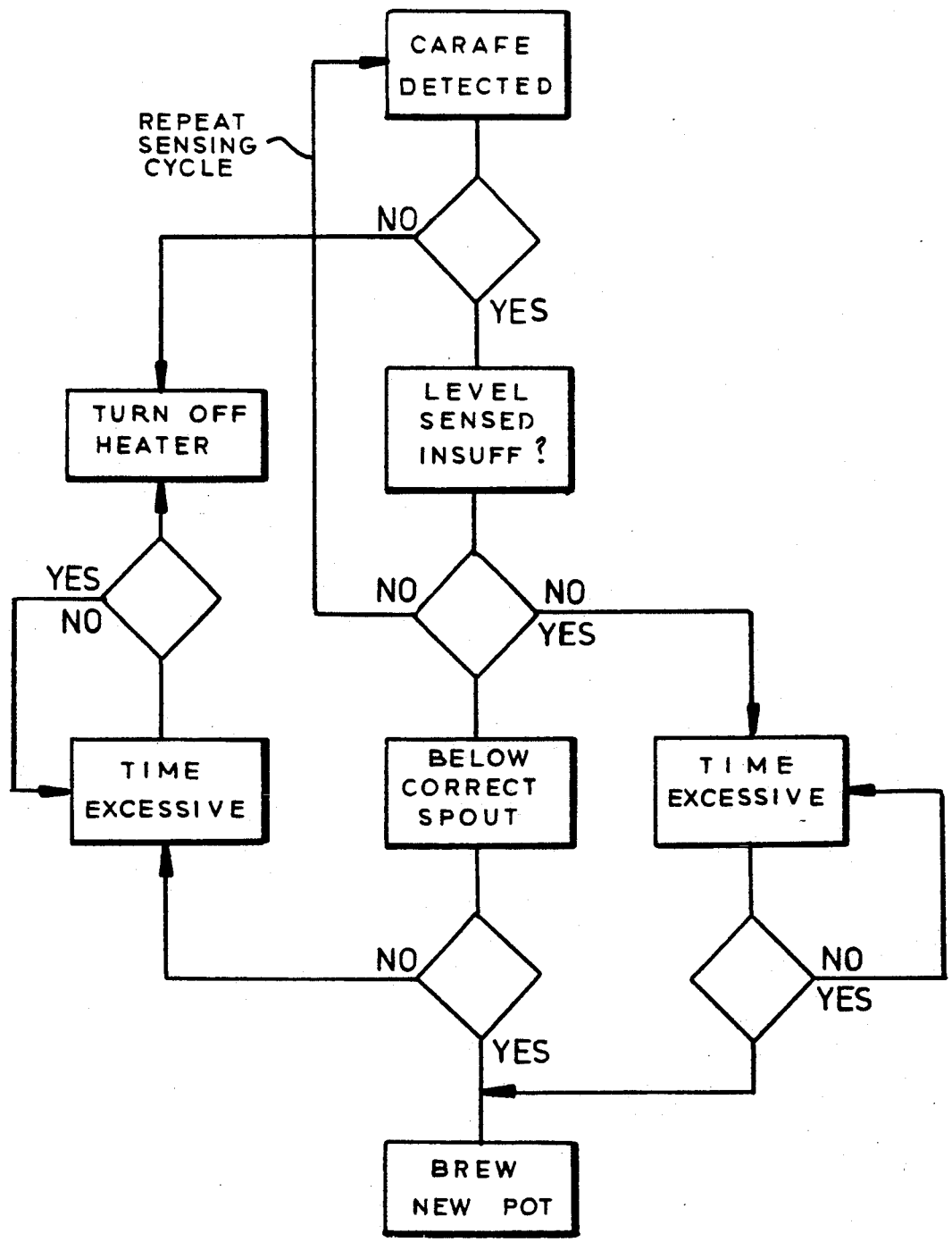
FIG. 11 is a diagram of an algorithm used with the apparatus of FIGS. 6 and 7.

In FIG. 11, I have shown an algorithm for the control by the microprocessor based CPU of various parts of the apparatus. The user, of course, can select desired forms with the menuing buttons and numerical buttons of the keypad 203. The LCD display 202, in the system of the invention, allows the information to be displayed in whatever language, for example, English, Spanish, German, may be selected by the user from the menu.

When the CPU determines the level of coffee in a carafe from the ultrasonic detector, which also determines whether a carafe is in place, the information can be displayed on the LCD.

If it is determined that the carafe is in place or that the level of coffee is too low, but the level has remained that way for a period of time, the CPU shuts down the respective heating unit. If, however, the level is below a predetermined level, the program calls for a specific amount of this coffee to be available during the particular time period and there has not been such a lapse of time that the coffee is stale, the machine will cycle and fill the carafe with the selected quantity of coffee.

Because of the yoke shape of the magnetic strip readers, it is not necessary for the user to place the carafe exactly in a particular alignment at the respective stations since a wide range of angular positions will enable the particular carafe to be identified. Any of the carafes can be provided on any of the warming plates or stations at any time and the information as to that carafe will be readable from the display. The display can also indicate the length of time that coffee had been standing in the particular carafe. If the coffee level drops and the warmer shuts off for the reasons described then the display for that station and carafe will indicate an "off" status.

A carafe may contain a quantity of coffee just above the level required for initiating the brew cycle. If that CPU determines that other carafes contains the same coffee are low but not under the spout for brewing, the CPU will override the level monitoring control and cycle the appropriate beverage to maintain available the quantity of coffee preprogrammed for that day and time of day.

In FIG. 12 I have shown a portion of the front face of the machine of FIG. 7. This face comprises a panel 280 formed with the key pad 203 and the LCD display 202 previously mentioned along with a set 281 of control buttons which will be described in greater detail below. First, however, I will describe the images on the LCD display.

The LCD display 202 comprises columns 202a, 202b, 202c and 202d corresponding to the respective stations at which the carafes are provided and rows 202e signalling status, 202f displaying quantity of coffee in the carafe and 202g displaying which type of coffee is in each carafe, d representing decaffeinated and c representing regular coffee. The uppermost ror 202h contains the menu 202i, in the illustrated case showing that a lunch cycle is in progress and the time 202j.

In row 202f, the images of carafes are displayed with the quantity of coffee therein shown graphically. For example, the amount of coffee in the extreme right-hand station is practically nil and hence the heater has been turned off as indicated by the corresponding display in row 202e. The freshly brewed pot is in the second station from the left and its status as freshly brewed in represented by the character display FR in row 202e. In the remaining columns of row 202e, the time since brewing of the respective quantities of coffee in the respective carafes is show, for example, at 35 minutes and 56 minutes, respectively.

The programming controls 291 include a program set bar 281a, buttons 281b and 281c for stepping the menus in opposite directions, a program interrupt button or bar 281d and a clear button or bar 281e. The program interrupt allows an empty carafe to be placed on one of the dispensing stations and automatically to trigger a refill of that carafe with the proper type of coffee and immediate brewing thereof as described.

In FIG. 12 as well, the stations can be seen to be provided with panels 282a and 282b which can be color coded, if desired, for the respective types of coffee if certain stations are to be assigned the particular types of coffee, although it will be understood that the system of the invention commands the dispensing of a particular type of coffee to a particular carafe as controlled by the reading of the carafe code so that special coding of the stations is not necessary.

Figure 14:
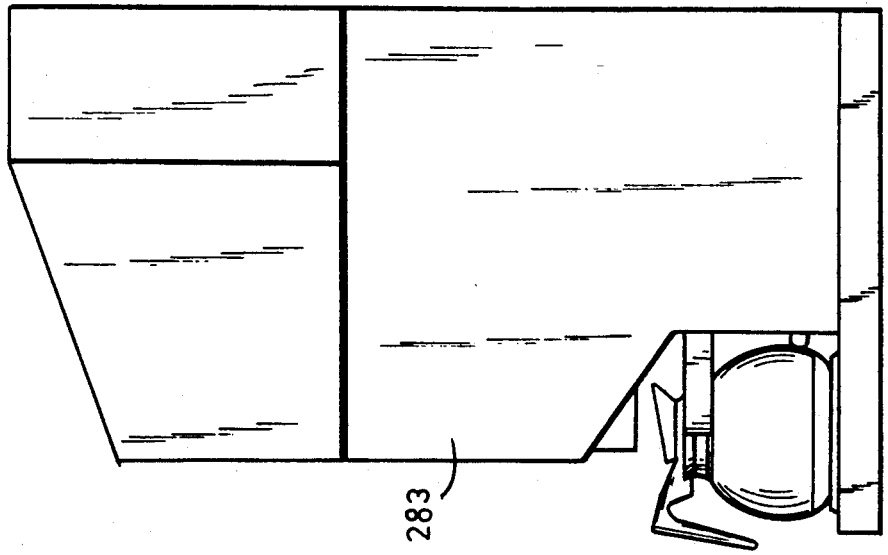
FIG. 14 is a side elevational view thereof.
Figure 13:
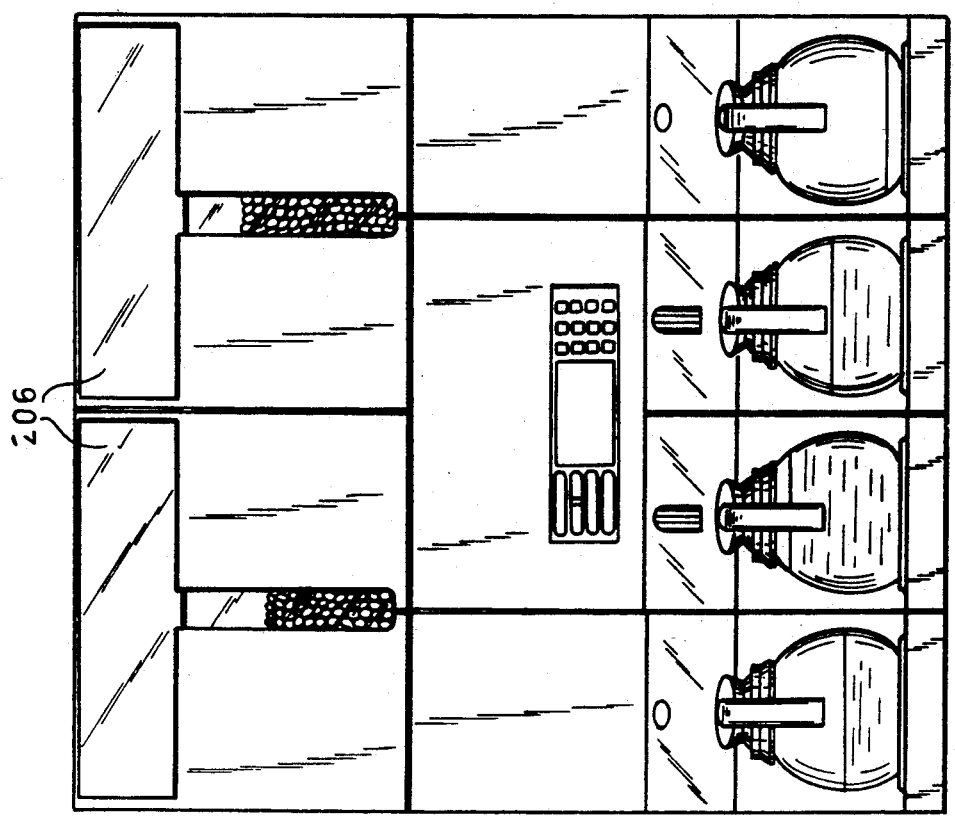
FIG. 13 is a front elevational view of the machine showing its housing.

Turning now to FIGS. 13 and 14, the housing 283 is visible. The covers 206 for the respective bins are here shown to be transparent to permit the quantity of ground coffee in the respective bins to be readily ascertained.

Figure 15:
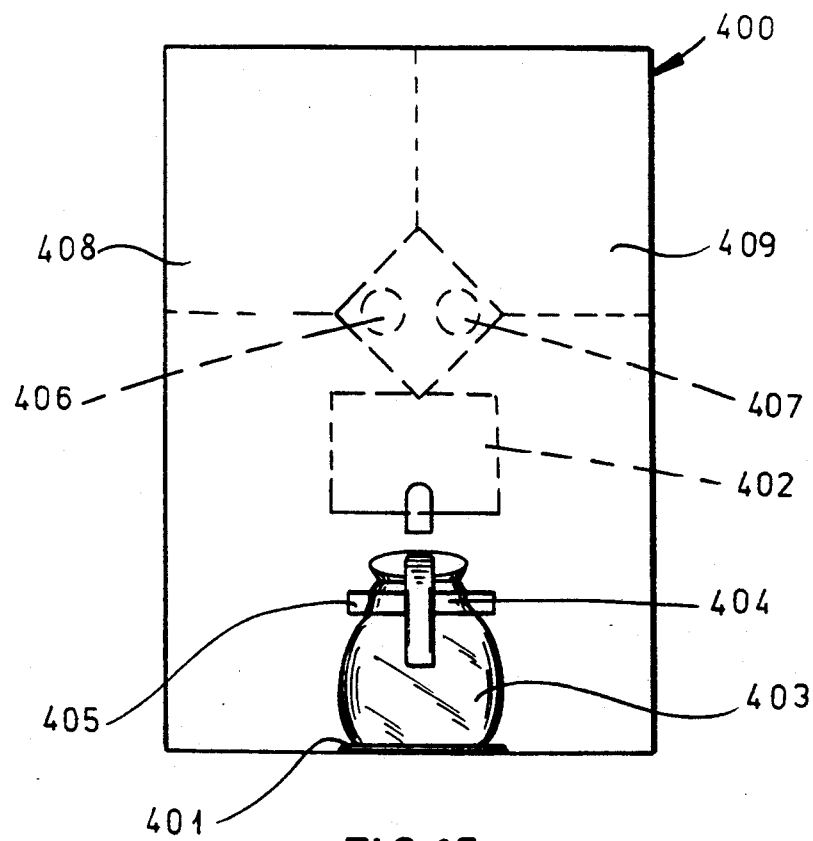
FIG. 15 is an elevational view of another embodiment.

In FIG. 15, I have shown an embodiment where a single station 401 of the machine 400 is provided beneath a brewing chamber 402 which can dispense the coffee into the carafe 403. The carafes in this system are provided with codes along their neck bands 404, as previously described for cooperation with the code reader 405 to trigger the microprocessor to operate one or the other of the scoopers 406 and 407 to dispense coffee from the respective bin 408 or 409 into the brewing chamber for brewing in the manner described. The brewing chamber or unit can have the construction described in connection with FIG. 7.

In this case, a sensor of the type described for the level of coffee in the carafe can be provided as well. Unlike the embodiments previously discussed in which a plurality of stations were provided on the machine, here respective carafes coded for regular coffee or decaffeinated coffee can be randomly placed at the station 101 and can automatically command refilling of the carafe with the respective type of brewed coffee utilizing selective control of the scoopers.

The filter of the brewing unit will be washed out, as previously described, automatically.

Figure 16:
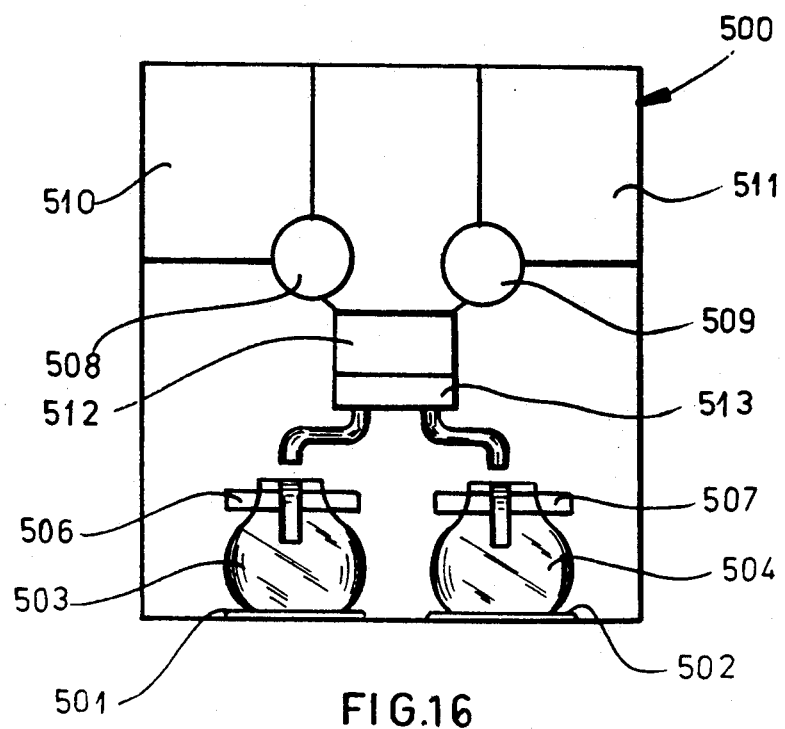
FIG. 16 is a similar view of yet another coffee-making machine of the invention.

In the embodiment of FIG. 16, the coffee machine 500 has stations 501 and 502 for carafes 503, 504 which can be coded in the manner described to cooperate with code readers 506 and 507 at these stations.

Either of these stations may receive a carafe coded for either regular coffee or decaffeinated coffee.

The scoopers 508 and 509 cooperate with the respective bins or hoppers 510 and 511 for decaffeinated and regular coffee and dispense one or the other into a single brewing unit 512 which is provided with a distributor 513 of the type described in connection with FIG. 1.

The brewing unit can be of the type described with respect to FIG. 7 and the level sensor of FIG. 7 may be provided in this embodiment as well.

In the operation of this embodiment, therefore, whenever a regular coffee or decaffeinated coffee carafe is empty, as detected by the level sensor, the microprocessor will trigger the respective scooper to dispense the corresponding ground coffee into the brewing unit and the brewing unit will be activated to produce the corresponding beverage which will be fed by the distributor 513 to the proper station based upon the coding of the carafe.

I claim:

1. A method of operating a coffee-making machine having brewing means on a housing for brewing at least two different coffee beverages and dispensing same and means forming at least two dispensing stations at said housing and respectively dispensing at least one of said beverages, said method comprising the steps of:
   (a) automatically sensing a level of a coffee beverage in a receptacle disposed at one of said stations;
   (b) identifying said receptacle with a particular one of said beverages; and
   (c) upon the level sensed in step (a) falling below a predetermined level, automatically brewing the particular one of said beverages and dispensing the brewed beverage into said receptacle.

2. The method defined in claim 1, further comprising the step of establishing a duration of time for which a quantity of one of said beverages has been present in a respective receptacle and interrupting a brewing cycle when said time exceeds a predetermined duration.

3. The method defined in claim 1, further comprising the step of establishing a duration of time for which a quantity of one of said beverages has been present in a respective receptacle and terminating heating thereof when said time exceeds a predetermined duration.

4. A method of brewing a selected infusion beverage which comprises the steps of:
   (a) placing a selected coded receptacle of a plurality of receptacle coded to receive respective infusion beverages at a dispensing station;
   (b) automatically reading coding of said selected receptacle;
   (c) automatically introducing an infusion beverage product into a brewing chamber in response to the reading of said coding;
   (d) automatically feeding hot wat to said brewing chamber to form said beverage; and
   (e) automatically dispensing said beverage into said selected receptacle at said station in response to said coding.

5. The method defined in claim 4, further comprising the step of automatically sensing a level of beverage in said selected receptacle and controlling the dispensing of beverage into said selected receptacle in response to the sensed level.

* * * * *